July 30, 1963 R. L. GODSHALK 3,099,467
EXPANSION PIPE JOINT FOR CONVEYING SOLIDS LADEN GAS OR FLUID
Filed March 3, 1959 4 Sheets-Sheet 1
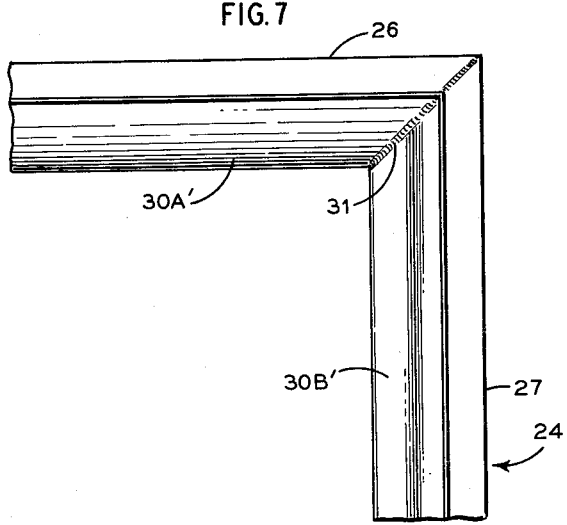
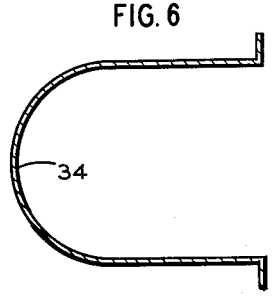
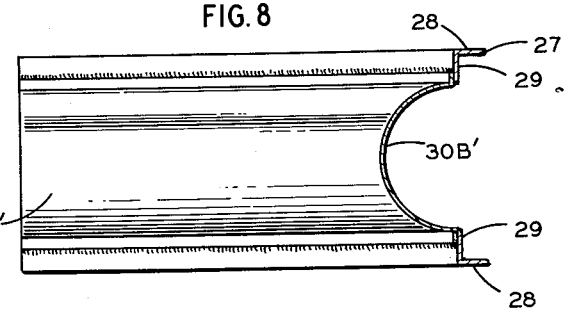
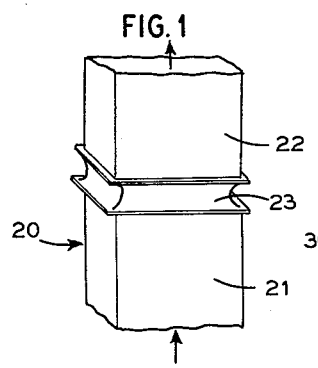
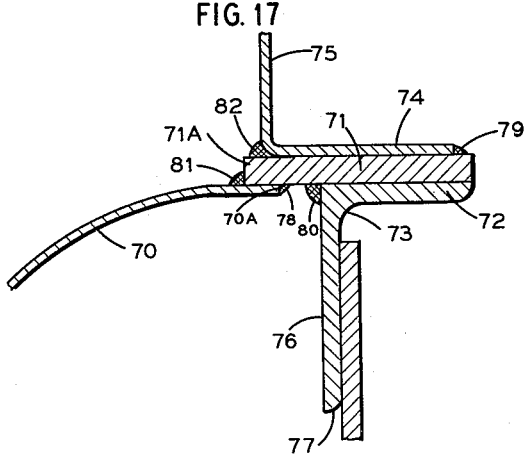
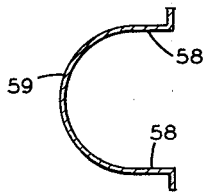
*INVENTOR.*
Russell L. Godshalk
BY
ATTORNEY July 30, 1963  R. L. GODSHALK  3,099,467
EXPANSION PIPE JOINT FOR CONVEYING SOLIDS LADEN GAS OR FLUID
Filed March 3, 1959  4 Sheets-Sheet 2
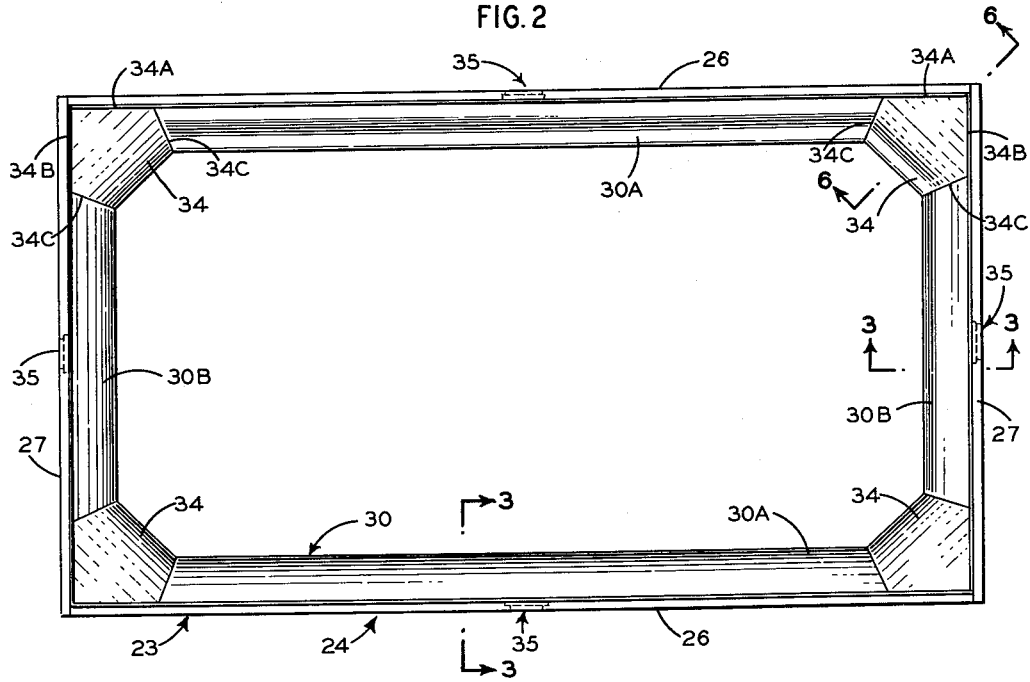
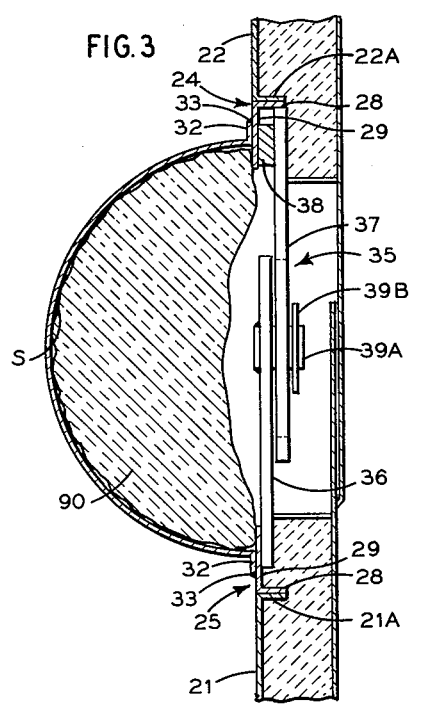
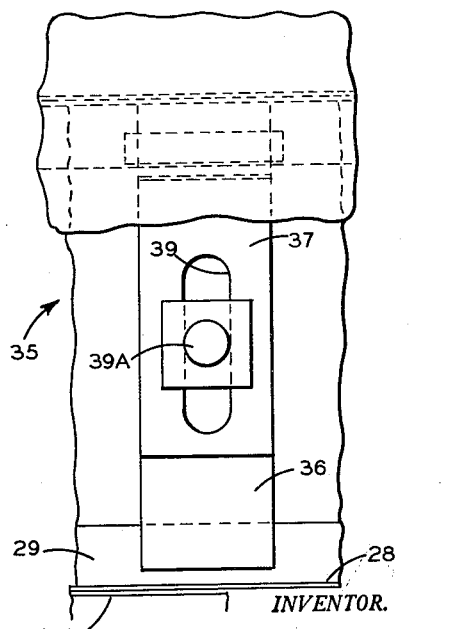
INVENTOR.
Russell L. Godshalk
BY
ATTORNEY

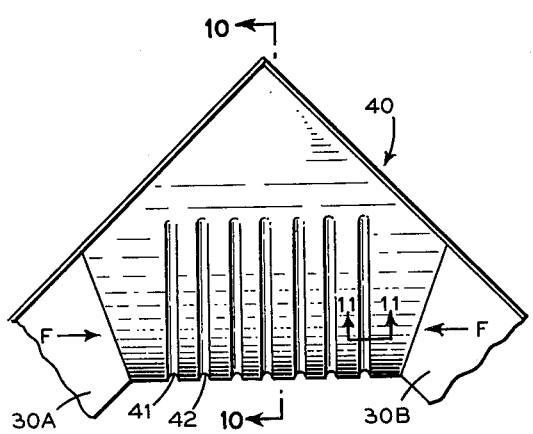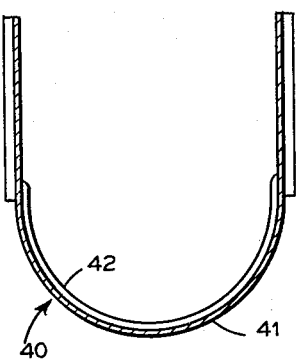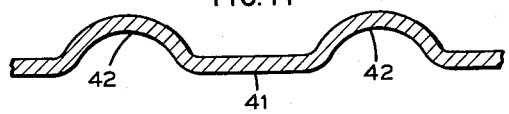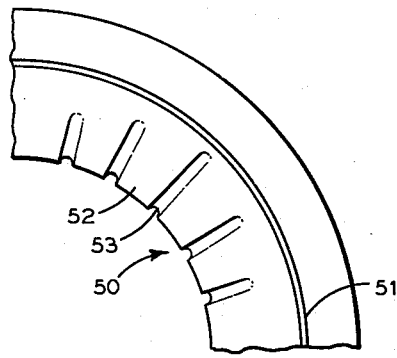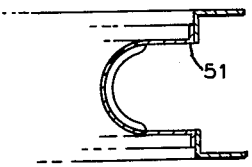

July 30, 1963   R. L. GODSHALK   3,099,467
EXPANSION PIPE JOINT FOR CONVEYING SOLIDS LADEN GAS OR FLUID
Filed March 3, 1959   4 Sheets-Sheet 4
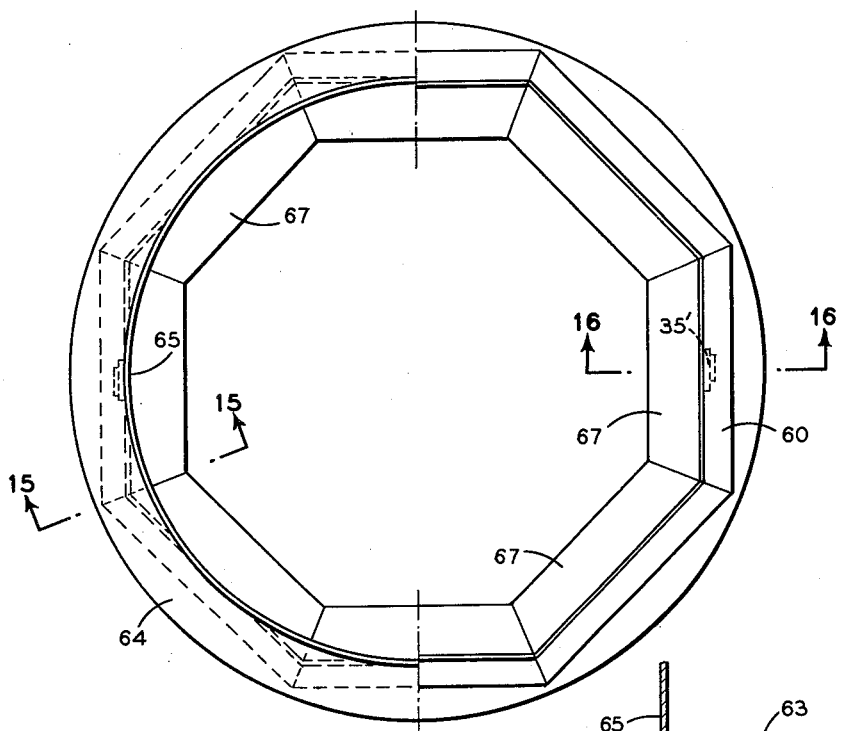
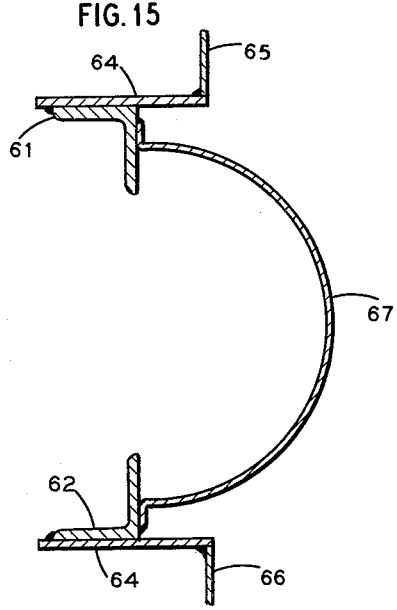
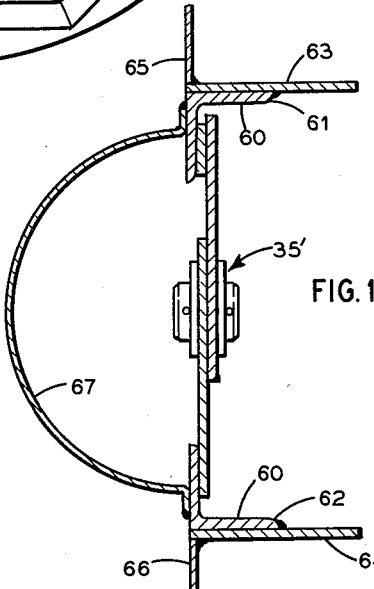
INVENTOR.
Russell L. Godshalk
BY
ATTORNEY

# United States Patent Office 3,099,467
Patented July 30, 1963

3,099,467
EXPANSION PIPE JOINT FOR CONVEYING
SOLIDS LADEN GAS OR FLUID
Russell L. Godshalk, Akron, Ohio, assignor to The
Babcock & Wilcox Company, New York, N.Y., a corporation of New Jersey
Filed Mar. 3, 1959, Ser. No. 796,910
5 Claims. (Cl. 285—114)

This invention relates in general to expansion joints and more particularly to a fluid conducting expansion joint adapted for connecting together a plurality of ducts or conduit sections to accommodate relative axial, lateral or angular movement therebetween.

The expansion joint of this invention is generally adapted for connecting together conduit or duct sections conveying a fluid or gas under varying conditions of pressure and temperatures, and is particularly adapted for connecting duct sections conveying a corrosive and/or dust laden fluid or gas.

Heretofore, bellows or accordion type expansion joints having a plurality of V-shaped folds have been extensively employed for connecting together a plurality of duct sections adaptable for conveying a fluid or gas under varying conditions of temperature and pressure so as to accommodate relative movement between adjacent duct sections, as for example, in the duct work associated with a steam generator through which the heating gases flowing from an economizer section are directed to an air heater sections. As such heating gases are generated by the combustion of fuel, solid particles of fly ash and other impurities are inherently entrained in the gases as they flow through the generator unit. As a result, a condition is established wherein precipitation of the entrained solids and/or corrosive particles out of the gases as they flow through the expansion joint cause the solids and impurities to accumulate in the V's or folds of the bellows type expansion joint. With the passage of time, the solid accumulations in the folds become so great and so packed that the flexibility of the expansion joint is seriously impaired. Such bellow expansion joints are further adversely affected and their useful life greatly reduced by accumulations in the folds of corrosive acidic condensates which are formed upon the lowering of the gas temperatures as the gases are conveyed through the duct.

It is therefore an object of this invention to overcome the foregoing disadvantages by providing for an improved joint having a fluid impervious, flexible, smooth inner surface, membrane wall which is capable of providing the requisite flexibility to accommodate the relative movement between adjacent conduit sections connected thereto while at the same time rendering the joint free of any harmful accumulations of solids and/or corrosive material from occurring therein, which would otherwise hinder its operation.

Another object is to provide an expansion joint which is relatively simple in structure, easily manufactured, relatively inexpensive to produce and positive in operation.

According to this invention, the foregoing objects and other features and advantages are attained by an expansion joint comprising essentially a pair of spaced and substantially co-axially aligned frame members, each of which is formed of rigid structural elements connected to define a closed planar area and a fluid impervious, flexible, thin gauge, smooth wall metallic membrane connected to and between corresponding structural elements of the respective frame members. The flexible wall membrane is inwardly-bowed in cross-section to present a substantially smooth convex wall surface to the gas flow and entrained particles to provide the requisite flexibility to accommodate relative movement of the conduit sections connected thereto. Accordingly, the inwardly-bowed wall extends around the entire periphery of the frame members, defining the expansion joint. A means is also provided for limiting the expansive movement of the joint wall in operation.

A feature of this invention resides in the provision that the instant expansion joint can be formed to have any desired rounded or polygonal configuration in cross-section.

Another feature resides in particular corner connections for use in expansion joints having a polygonal configuration in cross-section to absorb or reduce the transverse strains which build up at the corners or joints formed between adjacent connecting flexible wall sections during operation.

Another feature resides in the provision that the expansion joint can be readily insulated with a blanket of insulating material without affecting the operation of the joint.

The various features of novelty which characterize this invention are pointed out with particularity in the claims annexed to and forming a part of this application. For a better understanding of the invention, its operating advantages and specific objects attained by its use, reference should be had to the accompanying drawings and descriptive matter which illustrate and describe the preferred embodiments of the invention.

In the drawings:

FIG. 1 illustrates schematically a portion of a duct arrangement in which the improved expansion joint of this invention is used to connect adjacent conduit sections.

FIG. 2 is a detailed plan view of an expansion joint made in accordance with this invention.

FIG. 3 is a detailed sectional view taken along lines 3—3 of FIG. 2 and showing the insulation therefor.

FIG. 4 is a front elevation view of FIG. 3 having portion broken away.

FIG. 5 is a detailed sectional view of a slightly modified embodiment of a cross-section shape of a flexible wall section.

FIG. 6 is a sectional view taken through a corner connection along line 6—6 of FIG. 2.

FIG. 7 is a simplified corner connection for use in a rectangular shaped joint of the type illustrated in FIG. 2.

FIG. 8 is a front elevation view of FIG. 7.

FIG. 9 is a detailed view of another modified corner piece for use in an embodiment as typified in FIG. 2.

FIG. 10 is a sectional view taken along line 10—10 of FIG. 9.

FIG. 11 is a sectional view taken on line 11—11 of FIG. 9.

FIG. 12 illustrates still another modified embodiment of a corner piece.

FIG. 13 is a front elevation view of FIG. 12.

FIG. 14 illustrates a modified expansion joint adapted for use with duct sections having either a circular or polygonal cross-sectional area other than rectangular.

FIG. 15 is a sectional view taken along line 15—15 of FIG. 14.

FIG. 16 is a sectional view taken on line 16—16 of FIG. 14.

FIG. 17 illustrates a modified construction by which the flexible wall is connected to the frame member.

Referring to FIG. 1 there is shown in accordance with this invention a portion of a conduit or duct arrangement 20 for conveying a fluid or gas under varying conditions of temperature or pressure, as for example, a duct arrangement associated with a steam generator unit (not shown) utilized for conveying heating gases from one heat exchanging section of the unit to another. Such duct arrangements comprise essentially a plurality of ducts or conduit sections or lengths which are connected together through one or more expansion joints for accommodating for relative axial, lateral or angular movement occurring between adjacent duct sections.

The portion of the duct arrangement 20 of FIG. 1 includes an inlet duct section 21 spaced from an outlet duct section 22, each duct section being illustrated as substantially rectangular in cross-section and in substantially co-axial alignment. Disposed between the duct sections 21, 22 and connecting the two together for uninterrupted fluid flow therethrough is an improved expansion joint 23 to accommodate for relative movement between the duct sections 21, 22, due either to thermal expansion and/or to the pressure of fluid flow therethrough.

The expansion joint 23, as shown in FIGS. 2 to 4, includes a pair of spaced frame members 24 and 25. Each frame member 24, 25 is formed of rectangularly disposed rigid structural members, e.g. angle members 26, 27, which form the opposed side and end portions, respectively, to define a closed area. As shown, the angle members 26, 27 are provided with perpendicularly disposed horizontally and vertically disposed leg portions 28 and 29, respectively. The adjacent side and end angle pieces are secured at the corners by any suitable means, e.g. welding, with the horizontally disposed leg portions 28 of the respective frame members 24, 25 extending outwardly to form a flange by which the frame members 24, 25 are secured to an outwardly turned flange 21A and 22A of duct sections 21, 22, respectively.

Connected to and between the frame members 24 and 25 is a fluid impervious, flexible, thin gauge metallic membrane wall 30, which extends around the entire periphery of the joint. A #12 gauge steel plate has been found to be a suitable plate thickness to practise the invention.

According to this inventon the membrane wall 30 is inwardly-bowed and includes oppositely disposed longitudinally extending wall sections 30A and 30B, which define the opposed sides and ends, respectively, of the joint. In relatively large ducts the extended side and end portions 30A and 30B can be made of a plurality of shorter wall segments of predetermined length, which have their adjacent ends welded together with a seal weld. In this manner an integral wall section 30A, 30B of any desired length may be formed.

In one form of the invention, as shown in FIG. 7, the adjacent end and side wall sections 30A¹, 30B¹ are joined together with a simple miter connection formed on a 45° angle and secured together by a seal weld 31.

The cross-sectional shape of the flexible wall 30 circumscribing the periphery of the joint, as shown in FIG. 3, is substantially semi-circular, being inwardly-bowed towards the inside of the duct; the arcuate portion of the flexible wall terminating with laterally extending flange portions 32. A continuous seal weld 33 along the marginal portion of the flanges 32 secures the flexible wall 30 to the vertical leg portion 29 of the frame members 24, 25.

To increase the flexibility of a mitered corner connection formed between adjacent side and end wall members 30A, 30B, and thereby decrease the load required to operate the same, a modified corner arrangement is employed, as illustrated in FIGS. 2 and 6. This modified corner arrangement provides for an extended plate area which will readily buckle or flex and thereby minimize the load required to move the joint. Referring to the corner form of FIG. 2, each corner includes an angularly disposed corner piece 34 which is formed of an inwardly-bowed, thin gauge metallic plate, formed generally of the same material as the adjacent wall sections 30A, 30B connected thereto and of the same, or slightly thinner gauge, e.g. #18 steel gauge plate. An alternate construction would be to form the corner pieces 34 from a metal having a lower modulus of elasticity as, for example, titanium. Each of the corner pieces 34 is formed so as to have adjacent outer edge portions 34A, 34B define a right-angle to correspond to the corner angle formed between corresponding adjacent side and end frame members 26, 27. The ends 34C of the corner piece 34 and the terminating edge portions of the adjacent side and end wall members 30A, 30B adapted to be connected thereto are angled at approximately 22½° so as to complement one another to form a mitered connection therebetween, as shown in FIG. 2. Securing the corner piece 34 to the adjacent wall members 30A, 30B is had by seal welding the juncture thereof.

As illustrated in the expansion joint of FIG. 2, means 35 are provided for limiting the expansive movement of the joint. Referring to FIGS. 3 and 4, the limiting means 35 includes a plate 36 secured to the vertical leg 29 of the lower frame member 25 and extends upwardly therefrom. A corresponding plate member 37 aligned therewith is secured to the upper frame member 24, a spacer block 38 being disposed therebetween so that plates 36 and 37 are disposed in overlying aligned relationship. One of the plates, as for example plate 37, is provided with a vertically elongated slot 39 and the other plate, 36, is provided with a projecting pin 39A which is received in slot 39. A washer 39B secured to the pin is provided to prevent disengagement between the pin 39A and slot 39 during operation of the joint.

As illustrated the limiting means 35, as above described, is utilized in pairs, each pair including preferably diametrically opposed limiting means. In the form shown, a limiting means 35 is provided intermediate the ends of each of the side and end portions of the joint. Thus it will be noted that in operation the limit of relative movement of the respective frame members 24, 25 with respect to one another is defined by the vertical extent of the slot 39 on either side of the projecting pin.

In FIGS. 9 to 11, another modified corner piece 40 is illustrated by which the ability of the corner connections to flex is further increased, thereby further decreasing the load required to operate the same. This is attained by pre-wrinkling the corner piece with a plurality of transversely spaced embossed lands and grooves 41 and 42. In the operation of the corner, for example, opposed forces, as indicated by arrows F, occur thereat which must be dissipated by distortion of the plate surface, and in doing so develop high loads to operate the joint. By pre-wrinkling a corner piece 40 with embossed lands and grooves 41 and 42, the opposed forces are reduced and in turn the operating load required to operate the joint employing the same at the corners is likewise reduced.

FIG. 12 illustrates still another modified corner piece 50 which is particularly adapted for use either with rounded or circular duct sections or for rectangular ducts having rounded corners. As shown the outer edge 51 of the corner piece 50 is arcuate, and as illustrated conforms to a quarter circular arc. Because of its arcuate inner and outer edge configuration and its inwardly-bow shape in cross-section, this type of corner is preferably die formed. In the illustrated embodiment the corner piece is pre-wrinkled with embossed lands and grooves 52, 53 in order to reduce the load required to operate or flex the same.

If desired the cross-sectional shape of the wall members may be modified slightly from a true semi-circular shape, as shown in FIG. 3, to a limited U-shape, as shown in FIG. 5. In this form the wall section is provided with straights 58 which form a continuation of the arcuate portion 59 of the wall.

FIG. 14 illustrates a modified expansion joint which is particularly suitable for connecting ducts having round or polygonal cross-sectional area other than rectangular. In the form illustrated, the expansion joint is octagonal in shape and thus closely approximates a circle. Consequently, it can be likewise utilized to connect round or circular duct sections together. In this form, the outwardly extending flanges or horizontally extending legs 60 of the spaced frame members 61, 62 are secured to outwardly turned flanges 63, 64 of the associated duct sections 65, 66, respectively. Each of the eight sides 67 of the expansion joint includes an inwardly-bowed flexible membrane wall section as hereinbefore described. Each side plate 67 is cut at an angle at its ends so that adjacent side sections 67 can be readily secured together with a mitered connection and seal welded together to form a fluid impervious, flexible joint. Opposed sides of the joint are further provided with limiting means $35^1$ consisting of a pin and slot arrangement which is similar in function to that hereinbefore described.

In order that the seal weld by which the flexible wall segments are connected to the frame members can be disposed on the outer side of the expansion joint and therefore rendered readily accessible for repair or replacement, a modified construction is resorted to as viewed in FIG. 17. In this form the flexible wall sections 70 are seal welded to a flat bar 71. As shown the bar 71 is disposed between horizontal leg 72 of a frame angle 73 and the outwardly turned flange 74 of the connected duct section 75 with the inner end of the bar 71A extending inwardly beyond the face 76 of the vertically disposed leg portion 77 of the angle piece 73. With this arrangement the arcuate flexible wall member 70 having an extending terminating edge portion 70A is welded directly to the inwardly extending portion 71A of the bar 71 with a continuous seal weld 78. A continuous seal weld 79 also secures the outer end of the duct flange 74 to bar 71. Straight welds are formed at 80, 81 and 82 to secure the bar to the frame angle 73, flexible wall member 70, and duct 75, respectively, these welds being generally two inches long and spaced on 12 inch centers. With this arrangement it will be noted that the sealing welds 78 and 79 are exposed to the outer side of the expansion joint and are readily accessible for repair or replacement.

Inasmuch as the duct arrangement 20 is adaptable for conveying a heated fluid or gas, the outer surfaces of the duct sections 21, 22 and the expansion joint 23 therebetween can be readily insulated without affecting the operation of the expansion joint. According to the invention the expansion joint 23 is readily insulated by applying a blanket of insulating material 90, e.g. mineral wool or the like, closely adjacent to and/or in contact with the outer concave surfaces of the expansion joint, the insulating blanket 90 conforming to the outer concave surfaces of the joint. Thus the joint per se is readily insulated without affecting the operation of the same.

While the illustrated and described embodiments of the expansion joint as herein described are particularly adaptable for use in duct work conveying a heated and contaminated fluid or gas, it is to be understood that the structure need not be limited to such ducts, and that the structure defined herein is applicable for connecting any duct sections subjected to relative movement therebetween, regardless of the duct content.

While the instant invention has been disclosed with reference to a particular embodiment thereof, it is to be appreciated that the invention is not to be taken as limited to all of the details thereof as modifications and variations thereof may be made without departing from the spirit or scope of the invention.

What is claimed is:
1. In a duct system for a steam generator formed of a number of duct sections for conveying a solids laden heating gas flowing under varying conditions of pressure and temperature, the invention comprising an expansion joint for connecting adjacent axially aligned duct sections, each of said aligned duct sections having the same internal cross-sectional shape and dimensions whereby a smooth uninterrupted flow path is provided, and the accumulation of deposited solids at the joint is kept to a minimum comprising a frame member positioned at each of the adjoining ends of said duct sections connected by an expansion joint, each frame member comprising a plurality of similar L-shaped structural component sections integrally attached together to form a closed area having substantially the same internal cross-sectional area as said duct sections, said L-shaped sections providing the frame member with a pair of angularly disposed legs, each of said frame members integrally attached to one of said duct sections along one of its legs, an expansion joint member comprising a flexible single arcuately-shaped section having a convex face and a concave face and juncture section extending from each end of said arcuately-shaped section, said expansion joint member spanning the space between adjoining duct sections and having substantially all of the arcuately-shaped section thereof extending into the flow path through said duct sections with its convex face exposed to the flow of the solids laden heating gas therethrough, and the juncture sections on said expansion joint member integrally attached to the other legs of said frame members in such manner that a smooth faced substantially pocket-free joint is obtained between the juncture sections and said legs.

2. An expansion joint according to claim 1 wherein means are connected to each of the other legs of said frame members across the expansion joint between adjoining duct sections for limiting the extent of the expansion and contraction at the joint.

3. An expansion joint according to claim 1 wherein the arcuately shaped section of said expansion joint member is formed as a semi-circle.

4. An expansion joint according to claim 1 wherein said expansion joint member comprises a number of side pieces and connecting corner pieces welded together at miter joints to form an integral member.

5. An expansion joint according to claim 4 wherein the corner pieces of said expansion joint member have a number of grooves formed therein to provide additional flexibility to said member at the corners thereof.

References Cited in the file of this patent

UNITED STATES PATENTS

| | | |
|---|---|---|
| 846,379 | Ambrose et al. | Mar. 5, 1907 |
| 1,083,002 | Charls | Dec. 30, 1913 |
| 1,345,971 | Star | July 6, 1920 |
| 1,416,334 | Connery | May 16, 1922 |
| 2,180,128 | Stancliffe | Nov. 14, 1939 |
| 2,406,234 | Marancik | Aug. 20, 1946 |
| 2,691,536 | Tamminga | Oct. 12, 1954 |
| 2,732,227 | Kaiser | Jan. 24, 1956 |
| 2,758,612 | Zaleski | Aug. 14, 1956 |
| 2,871,885 | Ray | Feb. 3, 1959 |

FOREIGN PATENTS

| | | |
|---|---|---|
| 209,839 | Great Britain | Jan. 21, 1924 |
| 569,076 | France | Apr. 7, 1924 |